UNITED STATES PATENT OFFICE.

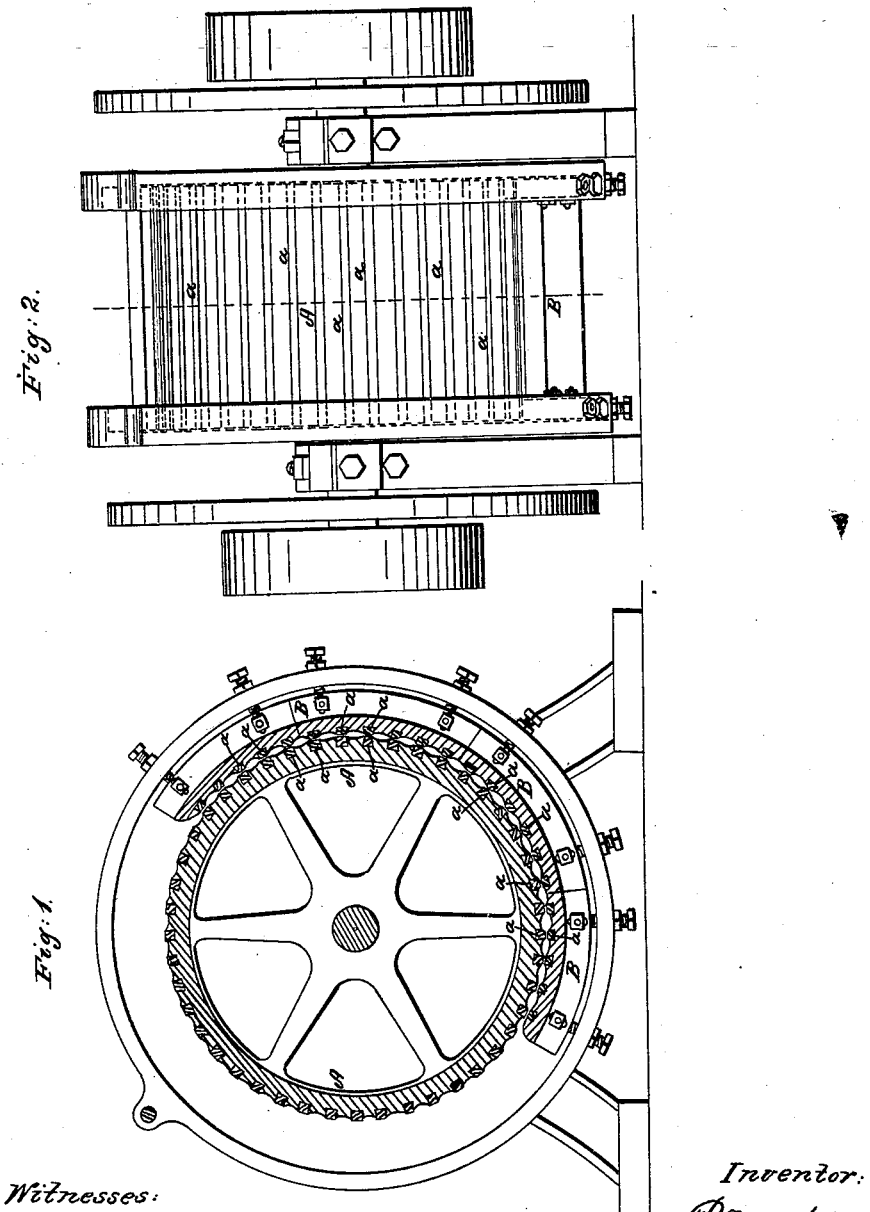

P. MARTIN, OF NEW ORLEANS, LOUISIANA.

IMPROVEMENT IN COTTON-SEED HULLERS.

Specification forming part of Letters Patent No. 29,393, dated July 31, 1860.

*To all whom it may concern:*

Be it known that I, P. MARTIN, of New Orleans, in the parish of Orleans and State of Louisiana, have invented a new and useful Improvement in Machines for Hulling Cotton-Seed; and I do hereby declare that the following is a full, clear, and exact description thereof, reference being had to the accompanying drawings, forming a part of this specification, in which—

Figure 1 represents a vertical cross-section showing a mill for hulling cotton-seed, in which figure my improvement, in securing the teeth into the runner or cylinder and concave shell, is clearly shown. Fig. 2 is a view of the entire machine, showing merely a front view of the hulling-cylinder, with the teeth inserted in its periphery.

Similar letters of reference indicate corresponding parts in both figures.

To enable those skilled in the art to fully understand my invention, I will proceed to describe its construction and operation.

The machines of this class are usually constructed with a solid cylinder and concave, the teeth or cutting-edges of which form a part of the casting, and with such machines the cutting-edges soon become dull, and they are rendered useless. Besides, the cutting-edges cannot very well be hardened nor repaired when once dull. Therefore, to obviate this objection, I employ steel knives *a*, of a prismoidal shape, as represented by their sections, Fig. 1. These are introduced across the surface of both hulling-cylinder A and concave B into dovetail grooves, as shown by the drawings, Fig. 1, between which grooves the surface of the cylinder, also that of the concave, is scored or furrowed out, so that the knives will have a cutting action on the seed as the cylinder is rotated.

Instead of dovetail grooves, any other suitable shape may be employed with knives of a corresponding shape; but the dovetail grooves will be found preferable for retaining the knives in place. The knives *a* should have their surfaces and edges parallel, so that they may be readily drawn out of the grooves and turned when occasion requires. As the surfaces of these knives wear down, a provision is made for setting up the concave B, and when they are entirely worn out new pieces can be readily made to supply their places. In this way the machine may be kept in perfect order, and as one edge of the knives get worn down they can be reversed and a new edge presented.

The machine should be constructed in such a way as to admit of the change of knives being made expeditiously.

The grooves or furrows between each knife *a* are well adapted to give the seed a rolling motion and to bring them up to the knives.

The concave B is made up of segments for the purpose of more readily adjusting it to the cylinder A.

Having thus described my invention, what I claim, and desire to secure by Letters Patent, is—

The employment of prismoidal reversible bar-knives *a*, in combination with the scored hulling-cylinder A and scored concave B, as and for the purpose herein shown and described.

P. MARTIN.

Witnesses:
V. DAVID,
J. ALDIGE.